United States Patent
Downing et al.

(10) Patent No.: US 6,373,855 B1
(45) Date of Patent: Apr. 16, 2002

(54) SYSTEM AND METHOD FOR USING AUDIO PERFORMANCE TO CONTROL VIDEO BANDWIDTH

(75) Inventors: Russell Downing, West Linn; Prakash Iyer, Beaverton, both of OR (US); Reid Kuhn, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/035,142

(22) Filed: Mar. 5, 1998

(51) Int. Cl.$^7$ ............................................. H04J 15/00
(52) U.S. Cl. ..................................................... 370/468
(58) Field of Search ................................. 370/468, 260, 370/265, 266, 271, 259, 391, 396, 252, 253, 229, 230, 231, 233, 234, 235, 351–354, 389, 395, 431–433, 449, 447, 461, 462, 465, 477; 348/10, 11, 17, 12, 13, 14, 15, 396, 423, 384.1, 385.1, 387.1, 388.1, 390.1, 397.1, 404.1, 424.2, 426.1, 429.1, 432.1, 441, 460, 461, 467, 469, 470, 556

(56) References Cited

U.S. PATENT DOCUMENTS

| | | | | |
|---|---|---|---|---|
| 5,392,223 A | * | 2/1995 | Caci ............................ | 348/17 |
| 5,546,324 A | * | 8/1996 | Palmer et al. ............... | 370/260 |
| 5,594,725 A | * | 1/1997 | Tischler et al. ............. | 370/260 |
| 5,608,653 A | * | 3/1997 | Palmer et al. ............... | 370/260 |
| 5,617,145 A | * | 4/1997 | Huang et al. ............... | 348/423 |
| 5,729,535 A | * | 3/1998 | Rostoker et al. ............ | 370/328 |
| 5,740,075 A | * | 4/1998 | Bigham et al. .............. | 348/13 |
| 5,874,997 A | * | 2/1999 | Haigh ......................... | 348/423 |

OTHER PUBLICATIONS

H. Schulzrinne, Audio–Video Transport Working Group; GMD Fokus, S. Casner; Precept Software, Inc., R. Frederick;; Xerox Palo Alto Research Center, V. Jacobson; Lawrencce Berkley Nat'l Laboratoray: Jan 1996: Network Working Group, Request for Comments: 1889, Standards Track, RTP: A transport protocol for real–time applications, pp. 1–58.

Chuck Forsberg, Omen Technology Inc.; The ZMODEM Inter Application File Transfer Protocol; pp. 1–48.

Chuck Forsberg; XMODEM/YMODEM PROTOCOL REFERENCE, File Transfer Protocols, pp. 1–29.

J. Postel, J. Reynolds ISI, Oct. 1985; FILE TRANSFER PROTOCOL, Network Working Group, Request for Comments; 1959; pp. 1–69.

International Telecommunication Union; ITU–T Recommendation H.320, "Narrow–Band Visual Telephone Systems and Terminal Equipment", pp. 1–41, Mar. 1993.

International Telecommunication Union; ITU–T Recommendation H.221, "Frame Structure for A 64 to 1920 kbit/s Channel in Audiovisual Teleservices", pp. 1–50, Mar. 1997.

International Telecommunication Union; ITU–T Recommendation H.323, "Packet–based Multimedia Communications Systems ", pp. 1–50, Mar. 1997, Series H: Audiovisual and Multimedia Systems.

Steven McCanne, Van jacobson, Martin Vetterli; "Receiver–driven Layered Multicast", pp. 1–14, ACM SIGCOM '96, Aug., Stanford, CA.

* cited by examiner

*Primary Examiner*—Dang Ton
(74) *Attorney, Agent, or Firm*—Kenyon & Kenyon

(57) ABSTRACT

A system and method is provided for allocating video bandwidth of a channel that carries both video and audio information. The quality of an audio signal received over the channel is determined, and the video bandwidth of the channel is changed based upon the quality of the received audio signal. The quality of the audio signal can be determined by measuring factors including audio latency, the extent to which audio packets that are sent are not received, the sampling rate at which audio information in the audio signal is digitized, and detecting a period of audio silence.

8 Claims, 3 Drawing Sheets

SYSTEM AND METHOD FOR USING AUDIO PERFORMANCE TO CONTROL VIDEO BANDWIDTH

FIELD OF THE INVENTION

The field of the invention relates to the transmission of multimedia information, and in particular to using the audio performance of a channel to control the video bandwidth of a signal with audio and video components.

BACKGROUND OF THE INVENTION

Audio-video (A-V) signals that are sent over a channel from an A-V sender to an A-V recipient are used to convey audio and video information for applications such as videotelephone conversations, television entertainment programming, and live news and sporting events. A channel is an entity that carries information between a sender and a recipient at a finite (although possible variable) bandwidth. "Bandwidth" means rate of information. For example, bandwidth is measured in bits per second. In another example, bandwidth is measured in characters per second.

In many A-V applications, receiving audio information above a certain minimum level of quality is more important than receiving the accompanying video information. For example, in videotelephony, it can be more important to receive an understandable audio signal than 30 frames-per-second of video information.

The channel over which A-V information is conveyed has a finite overall bandwidth, i.e., capacity to carry information. This finite bandwidth must be shared by the audio portion and the video portion of an A-V signal. In many cases, the overall bandwidth is not large enough to carry an A-V signal at the highest quality with which it can be sent. For example, an A-V sender can generate an A-V signal where the audio portion is music-quality at 40,000 bits per second, and the video portion is full-motion video at 30 frames per second at 120,000 bits per second. However, the overall bandwidth of the channel is only 80,000 bits per second. At this time, the sender must decide how much of the 80,000 bits per second of overall bandwidth available on the channel to allocate to the audio signal, and how much to allocate to the video signal. For example, the A-V sender may decide to send the audio signal at 20,000 bits per second, and the video signal at only 15 frames per second at 60,000 bits per second. Together, the audio and video signals in this example fill the 80,000 bits per second of overall bandwidth available on the channel.

Known techniques adapt the bandwidth of a signal to be sent based upon performance parameters of, for example, the processor performance of the recipient. For example, in one known system, a file is transferred from a sender to a recipient in blocks. Initially, the blocks are sent at a default size. If fewer than a given number of bad blocks are reported by the recipient for the most recent blocks attempted to be transferred, then the block size is increased. If at any time during the transfer at least a certain number of bad blocks are reported for the most recent blocks attempted to be transferred, then the sender reduces the block size. An example of an adaptive transfer protocol is described in *Receiver-driven Layered Multicast*, by Steven McCanne, Van Jacobson and Martin Vetterli, ACM SIGCOMM '96, Aug. 1996, Stanford Calif. However, such adaptive file transfer protocols do not distinguish between different types of content being transferred, and do not adjust the rate at which any one kind of content is transferred.

Other known A-V systems adapt the bandwidth of an A-V signal based upon information received from the recipient pertaining to the usage of the recipient processor. This is meant to prevent the recipient processor from becoming overwhelmed by having to process too rapid a rate of incoming information from the sender. One such known system is used by the ProShare® application made by the Intel Corporation of Santa Clara, Calif. The ProShare® application is a videotelephone call that uses a microphone, speaker display and camera at both sender and recipient computers. ProShare® uses an algorithm that changes the bandwidth of an A-V signal. This algorithm operates independently of any signal received from a sender. Rather, when executed, the ProShare® application starts streaming local video from the recipient's own camera to a video window on the recipient's display. ProShare® monitors the load on the recipient's processor, and aims at using about 75–80% of the recipient's processor at all times. If another application is executed using the recipient's processor that consumes x % of the processor's capacity, then the algorithm in ProShare® immediately restricts the bandwidth of the A-V signal to the extent necessary to reduce its load on the processor by about 75-x %. This effectively reduces the bandwidth of the generated video signal. Likewise, the bandwidth of the A-V signal is increased when more processor capacity becomes available. The same algorithm operates in processing an A-V signal from a sender during a videotelephone call. Similarly, the video bandwidth is reduced if the sender detects congestion on the outgoing network channel. This occurs if the bit rate of the signal sent from the sender exceeds the bandwidth of the transport medium (e.g., a connection between sender and receiver that implements packet framing and channel allocation, Ethernet, etc.) A standard for packet framing and channel allocation is described in International Telecommunication Union Standard ITU-T H.221. A standard for Ethernet is described in Institute for Electrical and Electronics Engineers (IEEE) Standard 802.3.

In another known system, the audio portion of an A-V signal is allocated a fixed (guaranteed) amount of bandwidth over a channel, and the rest of the bandwidth is shared by other information, e.g., video, data, etc. One such known system uses a 2 KB-128KB Basic Rate Integrated Services Digital Network (ISDN) connection using International Telecommunication Union Standard ITU-T H.221, where ProShare® uses the ITU-T H.320 protocol described in International Telecommunication Union Standard ITU-T Recommendation H.320. Standards describing ISDN include Bellcore Standards TR444, TR448, TR317, TR394 and TR268. Other standards describing ISDN are published by the ISDN.ISO 8877, published by the International Telecommunication Union. In this known system, the audio portion of a signal is allocated a fixed (guaranteed) amount of bandwidth. If, for example, a whiteboard application is executed during a call and whiteboard application data is streamed between sender and recipient, ProShare® tries to allocate enough bandwidth for the whiteboard data. Whatever is left of the 128K bandwidth slice is allocated to video. The allocation of bandwidth is thus somewhat predefined in the H.320 standard. Because the audio bandwidth is almost guaranteed, it is not necessary to have the bandwidth of the video signal adjusted to allow for adequate bandwidth for the audio signal.

Known systems that adjust the rate at which information flows between sender and recipient based upon processor utilization ignore the problem of dynamically and efficiently responding to changes in the quality of the link between a sender and a recipient. For example, a processor may be free to accept a high bandwidth A-V signal, but the quality of the link may be such that only a small bandwidth of A-V information may be reliably transmitted. Known techniques provide no way of preferentially allocating audio bandwidth over video bandwidth in response to link quality.

Known systems that use fixed bandwidth allocations also ignore link quality and can be inefficient. An audio bandwidth of a fixed size can be inefficiently large for a link of high quality, and inadequate for a link of low quality.

A better system is needed that can dynamically and preferentially allocate A-V bandwidth based upon link quality.

SUMMARY OF THE INVENTION

An embodiment of the present invention provides a method for allocating video bandwidth of a channel that carries both video and audio information. In accordance with an embodiment of the present invention, the quality of an audio signal received over the channel is determined. The video bandwidth of the channel is changed based upon the quality of the received audio signal.

DETAILED DESCRIPTION

An embodiment of the present invention advantageously allows the recipient of audio and video information (an audio-video signal) over a channel to control the video bandwidth of the channel based upon the quality with which the audio-video signal is received.

Figure 1:
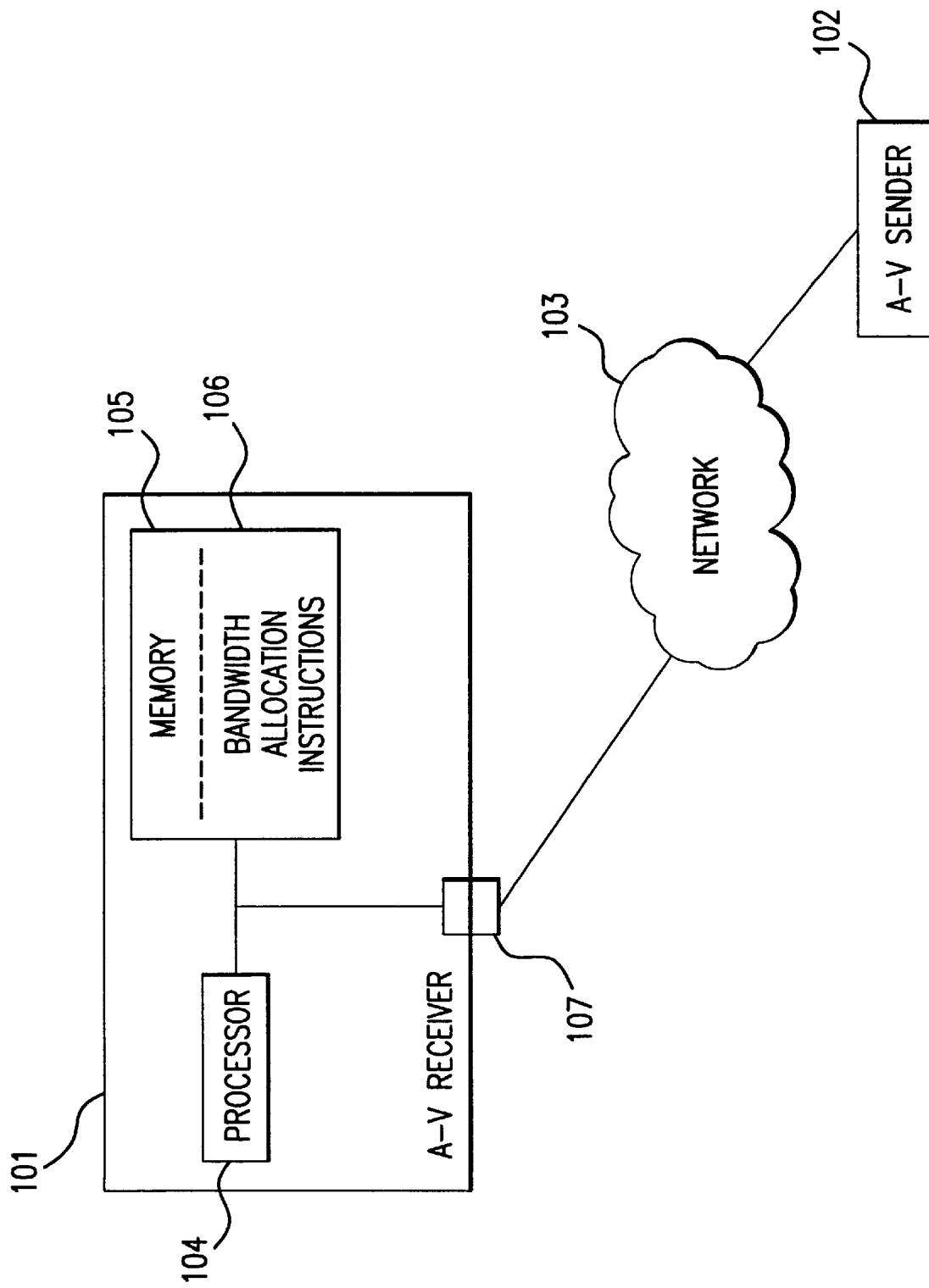
FIG. 1 shows an embodiment of an apparatus in accordance with the present invention.

An embodiment of the present invention is shown in FIG. 1. An audio-video (A-V) recipient 101 is coupled to an A-V sender 102 are coupled through a transport medium 103. A transport medium is meant to encompass any medium capable of carrying information between an A-V sender 101 and an A-V recipient 102. In the embodiment shown in FIG. 1, transport medium 103 is a network, e.g., the Internet. In another embodiment, transport medium 103 is a length of coaxial cable that directly connects A-V sender 101 and A-V receiver 102. In yet another embodiment, transport medium 103 includes electromagnetic (e.g., radio) waves.

In accordance with one embodiment of the present invention, A-V recipient 101 includes a processor 104 and a memory 105. Memory 105 stores bandwidth allocation instructions 106 adapted to be executed by processor 104 to determine the quality of an audio signal received over the channel, and change the video bandwidth of the channel based upon the quality of the received audio signal. Processor 104 is coupled to memory 105. In one embodiment, instructions 106 are adapted to be executed on processor 104 to determine the quality of the audio signal by measuring the quantity of audio data packets (e.g., less latency statistics) that were sent to A-V recipient 101 from A-V sender 102, but not received by A-V recipient 101. In another embodiment, the quality of the audio signal is determined by measuring the latency of the audio signal using audio latency statistics. In yet another embodiment of the present invention, the quality of the audio signal is determined by measuring the sampling rate used to digitize the audio signal. In another embodiment of the present invention, the quality of the audio signal is determined by detecting silence, i.e., the absence of an audio signal. During a period of silence, the video bandwidth can be increased to take advantage of the bandwidth not being used by the audio signal in accordance with the present invention. Any combination of these measurements can be used to determine the quality of the audio signal at the A-V recipient 101 in accordance with the present invention. In the embodiment shown in FIG. 1, A-V recipient 101 includes a port 107 that is adapted to be coupled to a transport medium 103. Port 107 is coupled to processor 104 and memory 105.

In one embodiment of the present invention, the quality of the audio signal can be determined using the Real-time Transfer Protocol (RTP) described in Network Working Group Request for Comments (RFC) 1889, <http://www.cis.ohio-state.edu/htbin/rfc/rfc1889.html, visited Feb. 26, 1998>. RTP provides control information pertaining to how an audio signal is being received, including latency and lost packet data. See RFC 1889, Section 6, "Real time Transfer Protocol (RTP) Control Protocol (RTCP) <http://www.cis.ohio-state.edu/htbin/rfc/rfc1889.html, visited Feb. 26, 1998>.

In accordance with an embodiment of the present invention, instructions 106 are adapted to be executed by processor 104 to change the video bandwidth of the channel based upon the quality of the A-V signal received at the A-V recipient as determined by the A-V recipient. In one embodiment, the video bandwidth is reduced if the quality of the received audio signal decreases, and increased if the quality of the received audio signal increases. In other words, when the quality of the audio signal decreases, more bandwidth is needed to maintain a certain level of quality of the audio signal. This bandwidth is taken from the video signal (the video bandwidth is reduced) and given to the audio signal. Likewise, when the quality of the audio signal increases, the audio signal does not need as much bandwidth to maintain a certain level of audio quality. Thus, bandwidth is taken from the audio signal and given to the video signal, i.e., the video bandwidth is increased.

As used herein, the term "video bandwidth" means the amount of video information that is carried on a channel. Thus, increasing video bandwidth can be achieved in two ways, i.e., by increasing the number of bits per second carrying video information on a channel; and by increasing the percentage of the overall bits per second carrying video information on a channel at a given time. For example, the bandwidth of a channel that carries fifty bits per second can be increased by thirty bits per second to carry eighty bits per second. Some or all of the added thirty bits per second can be used to carry video information, thereby increasing video bandwidth. In another example, a channel that ordinarily carries fifty bits per second (twenty bits per second of audio information and thirty bits per second of video information) encounters interference, thereby reducing its overall bandwidth to twenty bits per second. At twenty bits per second, the channel is directed to carry twenty bits per second of video information and five bits per second of audio information. In this example, the video bandwidth of the channel has increased, even though the number of bits per second of video information carried by the channel has decreased, because the fraction of bandwidth dedicated to video information has increased. These examples show that, as used herein, "increasing the video bandwidth" of a channel means increasing the number of bits per second of video information carried by the channel, or, when the overall bandwidth of the channel decreases, increasing the fraction of the overall bandwidth of the channel that is used to carry video information.

In one embodiment of the present invention, the video bandwidth is decreased by K percent whenever more than L packets sent by A-V sender 102 have not been received by A-V recipient 101 over any time interval of length M seconds, where K, L and M are real numbers. In one embodiment, K, L and M are advantageously set by the user at the A-V recipient 101, thereby allowing the user to determine how much video bandwidth is to be sacrificed in an effort to improve reception of the audio signal from A-V sender 102. In another embodiment, the number L is a percentage of packets that were sent but not received. On the other hand, video bandwidth is increased by N percent whenever fewer than O packets sent by A-V sender 102 have not been received by A-V recipient 101 over any time interval of length P seconds in one embodiment. The present invention also encompasses embodiments with more complex relationships among K and L, e.g., where K is changed continuously or discontinuously (or a combination thereof) as a function of L.

In yet another embodiment, video bandwidth is changed by -Q percent whenever the average change latency taken over a running period of R seconds exceeds S percent, where Q=bS, Q, R and S being real numbers and b being a constant. Thus, when the change in latency increases, the video bandwidth decreases in accordance with the present invention. When the change in latency decreases, the video bandwidth increases in accordance with the present invention.

In yet another embodiment, a lowering of the sampling rate at which the audio signal is digitized at the A-V sender produces a lower video bandwidth, and a higher audio sampling rate produces a higher video bandwidth in accordance with the present invention.

In accordance with an embodiment of the present invention, the video bandwidth of the A-V signal is changed based upon the quality of the audio signal received at the A-V recipient.

In one embodiment of the present invention, instructions 106 are adapted to be executed by processor 104 to send a message from the A-V recipient 101 to the A-V sender 102. The message includes an instruction to change the video bandwidth of the A-V signal based upon the quality of the A-V signal received at the A-V recipient. For example, the message includes an instruction to dedicate T percent of the bandwidth to video, where T is a number from zero to one hundred. In another embodiment, the message includes an instruction to dedicate a certain bit-rate to be used to send video information. For example, an instruction is to send the video information at nine hundred bits per second. In another embodiment, the instruction indicates only a change from the present video bandwidth, e.g., to increase or decrease the video bandwidth by a certain bit-rate, percentage, or predetermined increment.

Figure 2:
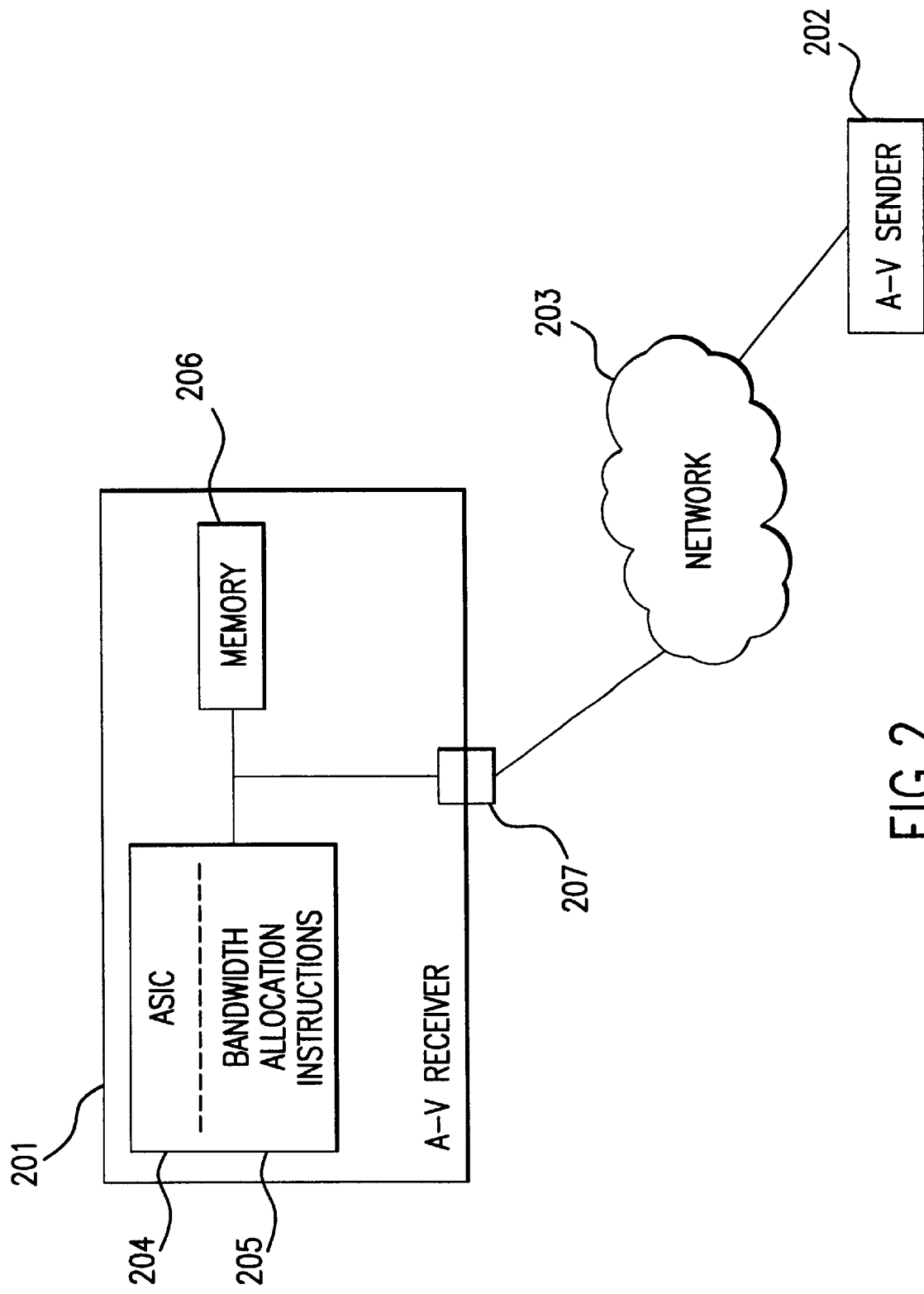
FIG. 2 shows another embodiment of an apparatus in accordance with the present invention.

Another embodiment of the present invention is shown in FIG. 2. An audio-video (A-V) recipient 201 is coupled to an A-V sender 202 are coupled through a transport medium 203. A transport medium is meant to encompass any medium capable of carrying information between an A-V sender 201 and an A-V recipient 202. In the embodiment shown in FIG. 2, transport medium 203 is a network, e.g., the Internet. In another embodiment, transport medium 203 is a length of coaxial cable that directly connects A-V sender 201 and A-V receiver 202. In yet another embodiment, transport medium 203 includes electromagnetic (e.g., radio) waves.

In accordance with one embodiment of the present invention, A-V recipient 201 includes an Application Specific Integrated Circuit (ASIC) 204 that at least partly embodies bandwidth allocation instructions 206 adapted to be executed by ASIC 204 to determine the quality of an audio signal received over the channel, and change the video bandwidth of the channel based upon the quality of the received audio signal in accordance with the method of the present invention. ASIC 204 is coupled to memory 205. In one embodiment (not shown), memory 205 stores a part of the bandwidth allocation instructions 206.

Figure 3:
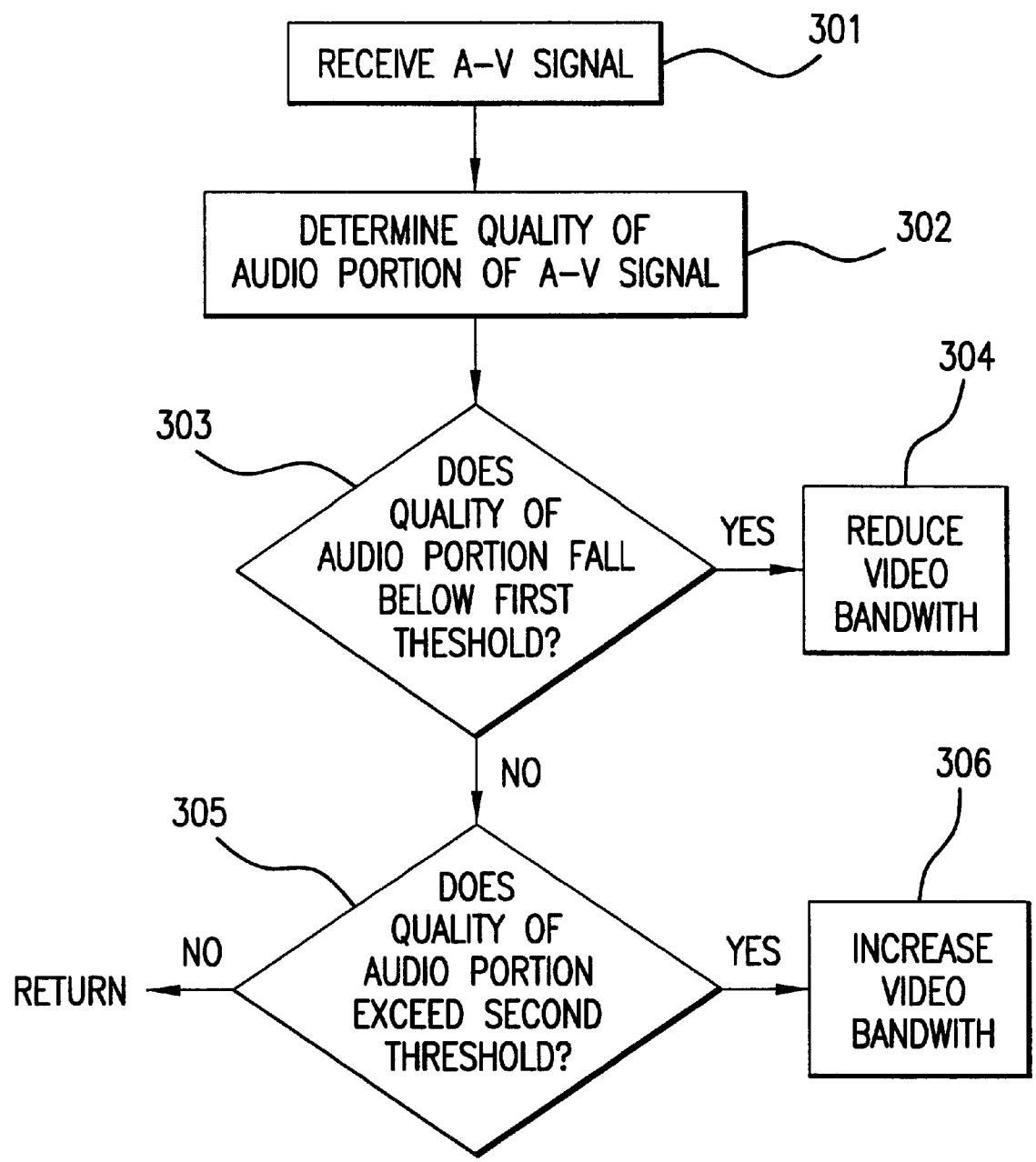
FIG. 3 shows a flow chart illustrating an embodiment of a method in accordance with the present invention.

A flow chart showing an embodiment of the method of the present invention is shown in FIG. 3. An A-V signal is received over a channel, step 301. The quality of the audio portion of the received A-V signal is determined, step 302. If the quality of the received audio signal falls below a first threshold, step 303, then a message is sent to the sender of the A-V signal to reduce the video bandwidth of the channel, step 304. If the quality of the received audio signal exceeds a second threshold, step 305, then a message is sent to the sender of the A-V signal to increase the video bandwidth of the channel, step 306.

What is claimed is:

1. A method for allocating video bandwidth of a channel that carries both video and audio information, comprising the steps of:
   a. determining the quality of the channel based upon the latency of an audio signal received over the channel;
   b. if the quality of the channel is determined to be below a first threshold, then decreasing the bandwidth allocated to the video signal; and
   c. if the quality of the channel is determined to be above a second threshold, then increasing the bandwidth allocated to the video signal.

2. An apparatus for allocating video bandwidth of a channel that carries both video and audio information, comprising:
   a. a processor;
   b. a memory that stores bandwidth allocation instructions adapted to be executed by said processor to determine a quality of said channel, wherein the quality of the channel is based upon at least one of: the latency of a received audio signal and the quantity of audio packets that were sent but not received by an intended recipient, and to decrease the video bandwidth of the channel if the quality of the channel falls below a first threshold, and to increase the video bandwidth of the channel if the quality of the channel exceeds a second threshold, said processor coupled to said memory; and
   c. a port adapted to be couple to a transport medium, said port adapted to receive the audio signal and video information, adcupletosaidepoocessor and said memory.

3. A medium storing instructions adapted to be executed by a processor to determine the quality of a channel that carries both audio and video information, wherein the quality of the channel is based upon the latency of an audio signal received over the channel and to decrease the video bandwidth of the channel if the determined quality of the of the channel falls below a first threshold.

4. The medium of claim 3, wherein said instructions are further adapted to be executed by the processor to increase the video bandwidth of the channel if the determined quality of the channel exceeds a second threshold.

5. A system for allocating the video bandwidth of a channel that carries both video and audio information, comprising:
   a. means for determining the quality of the channel based upon at least one of the latency of an audio signal sent from a source and received at a destination over the channel and the quantity of audio packets that were sent from a source but not received by their intended destination; and b. means for decreasing the video bandwidth of the channel if the quality of the channel falls below a first limit and increasing the video bandwidth of the channel if the quality of the channel exceeds a second limit.

6. A method for allocating video bandwidth of a channel that carries both video and audio information, comprising:

a determining the quality of the channel based upon the quantity of audio data packets that were sent but not received by an intended recipient of the audio data packets;

b. if the quality of the channel is determined to be below a first threshold, then decreasing the bandwidth allocated to the video signal; and c. if the quality of the channel is determined to be above a second threshold, then increasing the bandwidth allocated to the video signal.

7. A medium storing instructions adapted to be executed by a processor to determine the quality of a channel that carries both audio and video information, wherein the quality of the channel is based upon the fraction of audio packets that were sent from a source but not received at their intended destination, and to decrease the video bandwidth of the channel if the determined quality of the channel falls below a first threshold.

8. The medium of claim 7, wherein said instructions are further adapted to be executed by the processor to increase the video bandwidth of the channel if the determined quality of the channel exceeds a second threshold.

* * * * *

UNITED STATES PATENT AND TRADEMARK OFFICE
CERTIFICATE OF CORRECTION

PATENT NO. : 6,373,855 B1
DATED : April 16, 2002
INVENTOR(S) : Russell Downing et al.

It is certified that error appears in the above-identified patent and that said Letters Patent is hereby corrected as shown below:

Column 1,
Line 60, change "*Lavered*" to -- *Layered* --.

Column 5,
Lines 59 and 63, change "sender 201" to -- sender 202 --.
Lines 60 and 64, change "recipient 202" to -- recipient 201 --.

Column 6,
Lines 2 and 9, change "instructions 206" to -- instructions 205 --.
Lines 7 and 8, change "memory 205" to -- memory 206 --.
Line 50, change "adcupletosaidepoocessor" to -- and coupled to said processor --.
Line 57, after "quality" delete "of the".

Signed and Sealed this

Eighteenth Day of March, 2003

JAMES E. ROGAN
*Director of the United States Patent and Trademark Office*